Sept. 22, 1936. F. H. WELLS 2,055,244
BRAKE DRUM
Filed April 27, 1931

INVENTOR.
FRANKLIN H. WELLS
BY
ATTORNEY.

Patented Sept. 22, 1936

2,055,244

UNITED STATES PATENT OFFICE 2,055,244

BRAKE DRUM

Franklin H. Wells, South Bend, Ind., assignor to Bendix Brake Company, South Bend, Ind., a corporation of Illinois Application April 27, 1931, Serial No. 533,257

5 Claims. (Cl. 188—218)

This invention relates to brake structures, and more particularly to an improved brake drum.

The brake drum now generally employed in the automotive art is of relatively easily deformable low carbon steel which may be shaped or pressed into the desired shape. At the edge of its braking flange the drum is usually provided with an integral circumferential flange which is to serve in part to rigidify the drum and to increase the dissipation of the frictional heat generated during the braking operation; however, in spite of this reinforcing rib or flange the braking flange of the average drum is subject to an undesirable degree of distortion or "bell mouthing" which decreases the area of brake shoe contact and in general materially lowers the efficiency of the brake.

Accordingly, the principal object of the invention resides in the provision of a brake drum which will maintain its normal shape throughout the braking operation.

In the attainment of the above general object, there is provided a drum particularly designed to dissipate, both by conduction and radiation, the heat of friction developed during braking in such a manner that a more uniform temperature is maintained over the width of the drum, thereby thus decreasing the tendency to distortion.

A further object of the invention is to provide a drum braking flange materially strengthened against deflection due to brake shoe pressure by virtue of its specific structure without, however, unduly increasing its weight.

Yet another object is to provide a brake drum which serves as a means for creating air currents to cool the adjacent wheel rim.

A further object is to provide a drum which is self cleaning.

These and other equally important objects will become apparent from a reading of the following detailed description of typical embodiments of the invention, which embodiments are shown in the accompanying drawing in which.

In carrying out the invention, a brake drum may be formed up, in the usual manner, from a blank of deep draw steel so as to present a member having a head 10 and an integral circumferential braking flange 12.

Figure 1:
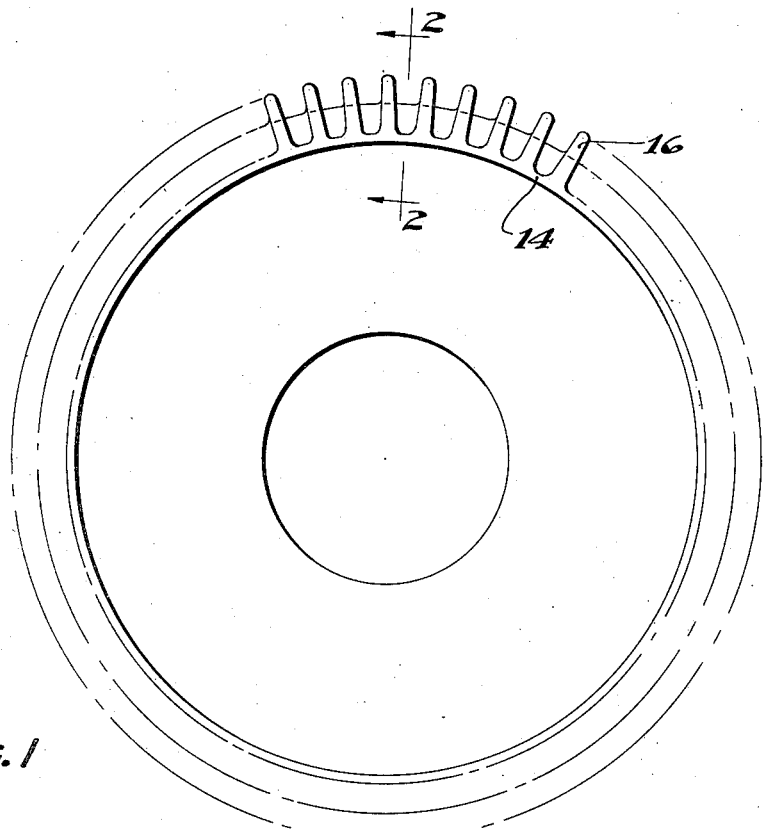
Figure 1 is a diagrammatic elevation of the drum disclosing, in part, the detail of the braking flange structure.
Figure 2:
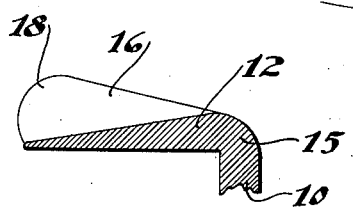
Figure 2 is an enlarged cross sectional detail taken on line 2—2 of Figure 1.

The invention particularly resides in the braking flange which may be pressed into the hereinafter described shape or may be cast separately and then rigidly secured, as by welding, to the head of the drum. The flange 12 is preferably tapered, to a predetermined slope, to form the triangular section disclosed in Figure 2, the material of the flange progressively increasing in thickness from the open or outer edge 14 of the drum flange to its rounded juncture 15 with the head 10 of the drum.

The braking flange is also preferably provided on its outer surface with spaced tapered transverse rigidifying and heat radiating fins 16 rounded at their outer ends at 18 and progressively decreasing in depth toward the juncture with the head of the drum.

The above described structure provides for rapid dissipation of the heat generated during the braking operation, the shape of the fins tending to cause the greatest dissipation at the open edge of the drum thereby rendering the temperature gradient, from the open to the closed edge, materially lower than that of the conventional uniform sectioned drum. The increase in metal section of the flange toward the head of the drum also tends to lower the above described temperature gradient, the flow of heat toward the open edge 14 being retarded by virtue of the decreasing thickness of the flange toward said edge 14, thus facilitating heat conduction into the head of the drum and rapidly dissipating a large portion of the heat.

The particular structure of both the fins and flange at the outer edge of the flange thus provides for greater radiation which, together with the heretofore described attributes of the inner end of the flange, insures a maximum rate of overall heat dissipation, and also insures a tendency of uniformity of temperature through the entire flange.

Referring to the factor of rigidity the increase in rim section toward the drum also serves to strengthen the drum, as a cantilever, against distortion at the open end. The fins likewise serve to strengthen the flange at the open end.

We have, therefore, a braking flange which inherently obviates distortion or "bell mouthing", this by virtue of the maintenance of a uniform temperature due to its conduction and heat emissivity attributes, together with its particular structure withstanding the load stresses of the contacting friction member.

It is furthermore to be noted that the axially arranged fins 16 serve as air impellers or fan blades setting up air currents, during the rotation of the drum, to cool the contiguous wheel parts, particularly the rim and its superposed tire.

Figure 3:
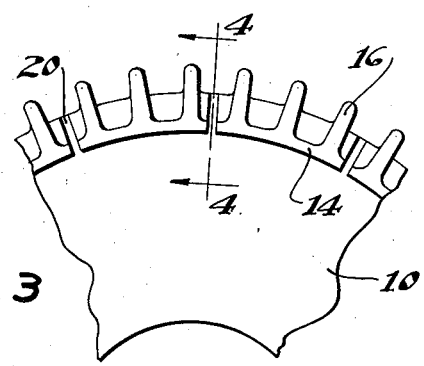
Figure 3 is a fragmentary view, in side elevation, of a modified form of drum.
Figure 4:
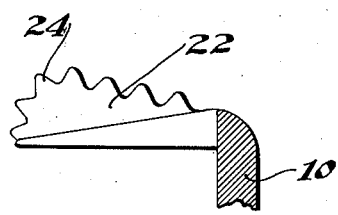
Figure 4 is an enlarged cross sectional detail of the drum of Figure 3 taken on line 4—4 thereof.

There is disclosed in Figures 3 and 4 a modified form of drum flange, the same being provided with annularly spaced slots 20 to provide a plurality of spaced braking flange segments. Fins 22 may also be provided at their outer edge with pointed or saw-tooth projections 24 to facilitate radiation of the heat. The slots insure ventilation of the drum and also provide a self cleaning function, the foreign matter entrapped within the drum being readily dispersed, either by gravity or by centrifugal force through the slots. The cantilever shape of the flange sections, as well as the fins provide a sufficiently rigid structure to permit this slotting which would otherwise so weaken the flange as to render the same impractical.

While there have been described and disclosed two embodiments of the invention, it is to be understood that these are given purely by way of example and since the principles of the invention may be incorporated in other specific structures, I do not intend to be limited to those described, except as such limitations are clearly imposed by the appended claims.

I claim:

1. A brake drum provided with a braking flange portion of tapered cantilever section, and further provided with a plurality of spaced transverse fin members of saw-tooth edge contour.

2. A brake drum having a braking flange of progressively increasing thickness from its outer edge to its juncture with the drum head, together with spaced reinforcing and heat radiating transverse fins projecting from the outer surface of said flange, said fins being of progressively decreasing depth from the outer edge of the braking flange, the upper edge of each fin being of sawtoothed contour.

3. A brake drum having a drum head, a braking flange portion of tapered cantilever section having the thickest section adjacent the drum, transverse reinforcing fins on the flange of progressively increasing depth from the drum head so that the braking flange and fins are substantially rectangular in cross section, said flange being provided with spaced transversely extending slots to provide a plurality of spaced braking flange segments.

4. A brake drum having closed and open ends, a brake flange of progressively decreasing thickness from the closed end, and spaced rigidifying fins of progressively increasing depth from the closed end, the outer end of said rigidifying fins being rounded, said brake flange being formed as a series of segments separated by spaced recesses.

5. A brake drum having closed and open ends, a brake flange of progressively decreasing thickness from the closed end, spaced rigidifying fins of progressively increasing depth from the closed end, the upper edge of each rigidifying fin being of saw-tooth contour, said brake flange being formed as a series of segments separated by spaced recesses.

FRANKLIN H. WELLS.